Nov. 19, 1929.   H. J. TAYLOR   1,736,059
LOCKABLE GEAR SHIFTING DEVICE
Filed July 9, 1923   2 Sheets-Sheet 1

INVENTOR
Herman J. Taylor.
BY
Frank H. Hubbard
ATTORNEY

Nov. 19, 1929. H. J. TAYLOR 1,736,059
LOCKABLE GEAR SHIFTING DEVICE
Filed July 9, 1923   2 Sheets-Sheet 2

INVENTOR
Herman J. Taylor
BY
Frank H. Hubbard
ATTORNEY

Patented Nov. 19, 1929

1,736,059

UNITED STATES PATENT OFFICE

HERMAN J. TAYLOR, OF MILWAUKEE, WISCONSIN, ASSIGNOR, BY MESNE ASSIGNMENTS, TO VULCAN MOTOR DEVICES COMPANY, A CORPORATION OF PENNSYLVANIA

LOCKABLE GEAR-SHIFTING DEVICE

Application filed July 9, 1923. Serial No. 650,312.

This invention relates to lockable gear shifting devices.

The invention is particularly applicable to preselective gear shifting devices and has among its objects to provide means for locking the selector mechanism of such devices in a position for neutralization of the controlled gears.

Another object is to provide a preselective gear shifting device having a key actuated lock associated therewith for locking the selector mechanism in a position for neutralization of the controlled gears, the key for said lock being insertable only upon neutralization of the controlled gears and setting of the selector mechanism in neutral position.

Another object is to provide a preselective gear shifting device of the aforesaid character having a lock guard associated therewith said guard being interlocked with the selector mechanism and with the gear shifting members to prevent insertion of the key, except upon neutralization of the controlled gears and setting of the selector mechanism in neutral position.

Another object is to provide a gear shifting device having means associated therewith for insuring against removal thereof from the gear set casing upon locking of the selector mechanism.

Various other objects and advantages will hereinafter appear.

The accompanying drawings illustrate an embodiment of the invention which will now be described, it being understood that the embodiment illustrated is not limited to the specific type of gear shifting device shown and is susceptible of modification without departing from the scope of the appended claims.

In the drawing; Figure 1, is a plan view of a gear shifting device embodying the invention, a portion of the enclosing casing thereof being shown in section:

Figure 1:
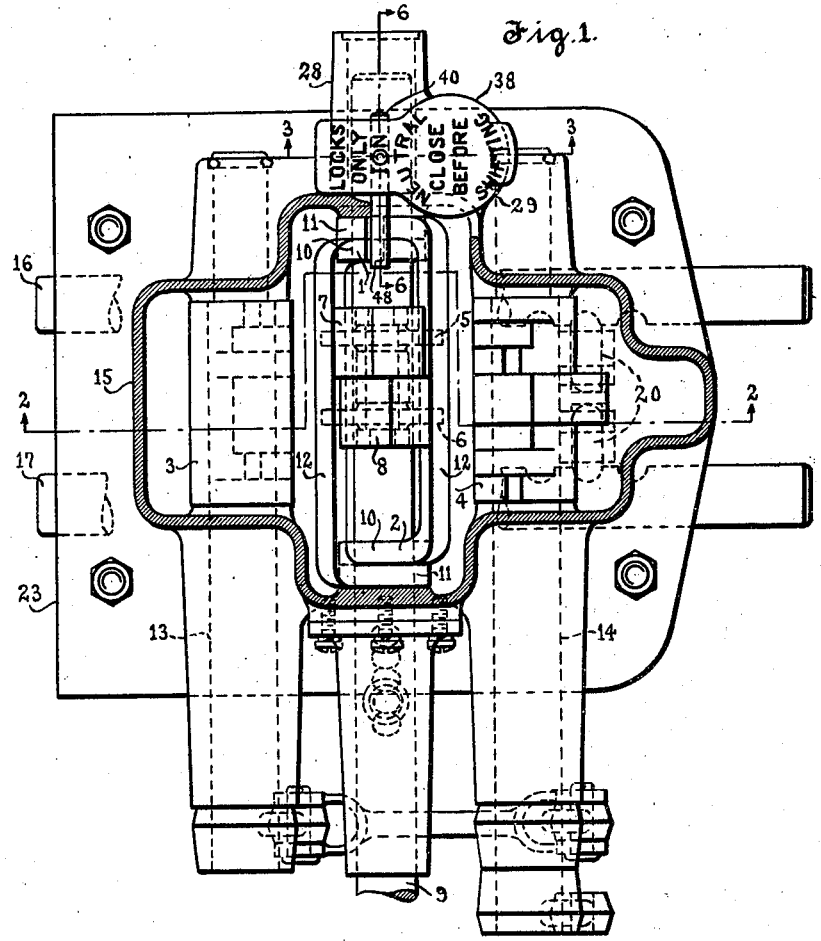
Figure 2:
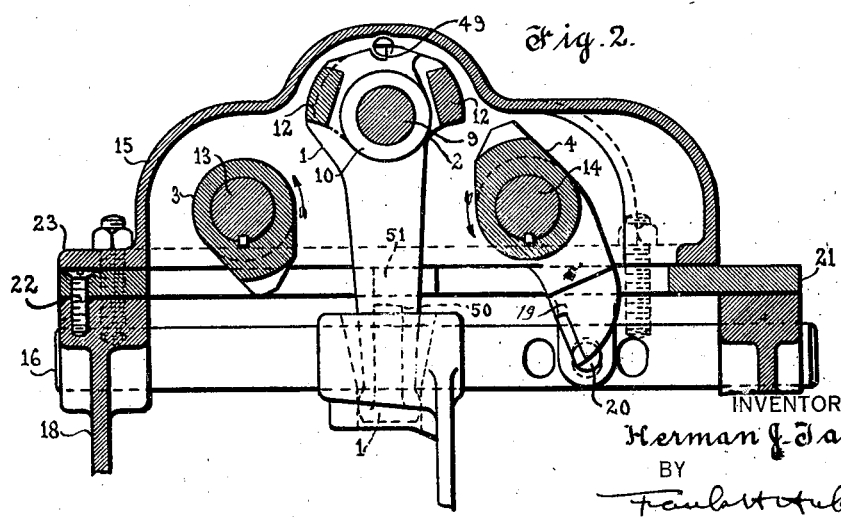
Fig. 2, is a sectional view on the broken line 2—2 of Fig. 1.

Referring to Figs. 1 and 2 the same illustrate a gear shifting device of the type disclosed in a co-pending application of William C. Stevens and Herman J. Taylor Serial No. 589,886 filed September 22, 1922. Said gear shifting mechanism includes oscillatable gear shifting levers 1 and 2, oscillatable cam elements 3 and 4 arranged on opposite sides of said levers and selector means including rollers 5 and 6 mounted on levers 7 and 8, respectively. The gear shifting levers 1 and 2 are rotatably mounted upon a shaft 9 and each of the same is provided with a bearing portion 10 at one end thereof and a bearing part 11 spaced with respect to said former bearing portion, and connected thereto by an offset rectangular extension 12. Levers 1 and 2 are arranged so that the extensions 12 thereof are located on opposite sides of shaft 9 and levers 7 and 8 are rotatably mounted on said shaft and are recessed to receive the extensions 12 of levers 1 and 2, respectively. Rollers 5 and 6 each project into recesses in the underside of shaft 9 whereby upon axial adjustment of said shaft said rollers assume different operative positions with respect to cam elements 3 and 4. Cam elements 3 and 4 are fixed to shafts 13 and 14, respectively, said shafts and shaft 9 being supported at opposite ends within suitable bearings provided on opposite walls of an inverted box shaped casing 15.

The gear shifting device is shown in connection with a gear set including shifter rods 16 and 17 slidably mounted within suitable bearings in a casing 18. Said rods each have a gear shifting fork secured thereto, the hub portion of one of said forks being shown in Fig. 2, and each of the shifting levers 1 and 2 has its lower end extending into a recess in the hub portion of one of said forks. Means is provided for locking the shifter rods 16 and 17 in their shifted and neutralizing positions, such means including a downwardly extending tail piece 19 associated with cam element 4 and a pair of locking parts 20 arranged on opposite sides of said tail piece and slidable within suitable bearings in an adapter plate 21. Tail piece 19 is normally located between the locking parts 20 to project the same into notches in the shifter rods 16 and 17 for locking of the latter in their shifted or neutralizing positions and upon a given movement of cam elements 3 and 4 in the direction indicated by arrows, said tail piece is moved out of the path of said locking parts to free said rods.

Adapter plate 21 is fixed to the upper face of the gear set casing by flat headed screws one of which is indicated at 22 in Fig. 2 and casing 15 of the gear shifting device is bolted to said former casing and is provided with an outwardly extending flange 23 which covers the heads of said screws.

As set forth in the aforementioned patent application the above described gear shifting mechanism is designed for use in connection with a three speed and reverse automobile gear set. The cam elements 3 and 4 are operatively connected to the clutch pedal to provide for movement thereof in the direction indicated by the arrows in Fig. 2 during release of the clutch and the selector member 9 is usually connected to a control lever mounted on the steering column to provide for axial adjustment thereof. Upon setting of shaft 9 in given axial positions cam elements 3 and 4 are adapted to actuate roller 5 to effect reverse and first speed operations of lever 1 and to actuate roller 6 to effect second and third speed operations of lever 2. Also upon setting of shaft 9 in the position shown the cam elements 3 and 4 are adapted to engage the rollers 5 and 6 to insure neutralization of both of the shift levers 1 and 2. As will now be set forth means is provided for locking shaft 9 in its neutralizing position such means being operative only upon neutralization of both of the shift levers 1 and 2 and setting of shaft 9 in its neutral position.

Figure 3:
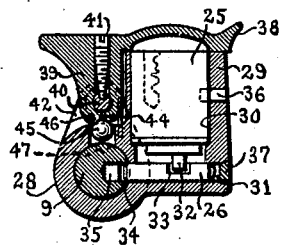
Figs. 3 and 4 are sectional views on line 3—3 of Fig. 1 illustrating the locking parts in different positions.
Figure 4:
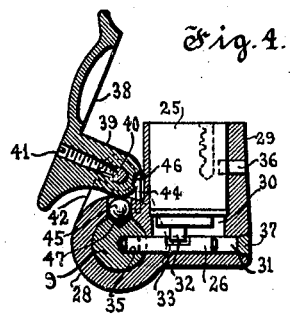
Figure 5:
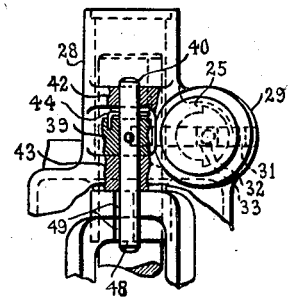
Fig. 5 is a plan view of the lock the upper portion of the lock guard being broken away.

The locking means for selector shaft 9 includes a barrel type lock 25 having a sliding bolt 26 associated therewith. As shown in Figs. 3, 4 and 5 the rear bearing 28 of shaft 9 has a lug 29 formed on one side thereof said lug being provided with a bore 30 for receiving lock 25 and also having a drilled opening 31 adjacent the underside thereof for receiving bolt 26. Lock 25 is provided with an eccentric pin 32 on the underside thereof which projects into a transverse recess 33 in the upper side of bolt 26, and as shown in Figs. 3 and 4 bolt 26 in its unlocked position projects into an elongated recess 34 in the side of shaft 9 to prevent turning of the latter while in the locked position thereof the same is adapted to engage a recess 35 in said shaft the latter recess being so located that the same is opposite the bolt in the neutral position of shaft 9. Lock 25 is held against removal from lug 29 by a pin 36 driven into an opening in the side of said lug and extending into an opening in said lock, and the outer end of the opening 31 for bolt 26 is closed by a tapered plug 37.

Lock 25 is provided with a guard 38 for covering the upper face thereof said lock guard being provided with a downwardly extending tail piece 39 having a drilled opening adjacent its lower end for receiving a hinge pin 40. Hinge pin 40 is fixed against rotation with respect to lock guard 38 by a screw 41 and the same is supported on opposite sides of the tail piece 39 by bearing lugs 42 and 43 projecting upwardly from the rear bearing 28 of shaft 9. A coil spring 44 is mounted on the hinge pin 40 between tail piece 39 and bearing lug 42 said spring having one end connected to said tail piece and its opposite end connected to said bearing lug to bias the lock guard toward the closed position shown in Fig. 3.

Lock guard 38 has interlocking means associated therewith to prevent opening thereof when shaft 9 is set in any position other than neutral and to also prevent movement of shaft 9 out of its neutral position as long as said guard is in its open position. Such interlocking means comprises a ball 45 arranged between lugs 42 and 43 and slidable within an opening in the upper side of bearing 28. When selector shaft 9 is in any position other than neutral, ball 45 is held by said shaft in the position shown in Fig. 3, in which position the same projects into a recess 46 in the under side of tail piece 39 to prevent opening of lock guard 38. Selector shaft 9 is provided with a recess 47 and upon setting of said shaft in neutral position said recess is located to receive ball 45. Lock guard 38 can then be opened since the ball 45 will drop into recess 47 and as shown in Fig. 4 upon opening of said key guard the tail piece 39 thereof holds ball 45 in engagement with recess 47 to lock shaft 9 in its neutral position.

Figure 6:
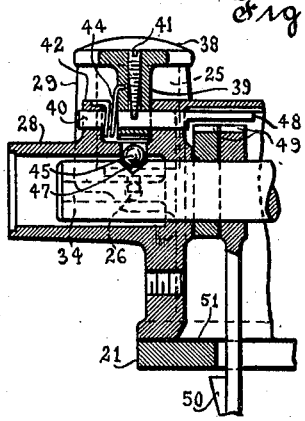
Fig. 6 is a fragmentary sectional view on line 6—6 of Fig. 1.

The lock guard 38 is also interlocked with the gear shifting levers 1 and 2 to prevent opening thereof except upon neutralization of both of the shift levers. For this purpose hinge pin 40 is provided with a projection 48 arranged above bearing portions 10 and 11 of levers 1 and 2 respectively, and extending across the same as best shown in Figs. 2 and 6. The projection 48 of hinge pin 40 is semicircular in cross section and the bearing portions 10 and 11 of levers 1 and 2 respectively are each provided with a quarter circular recess 49 on the upper side thereof for receiving said projection. The arrangement is such that upon neutralization of both of the shift levers 1 and 2 the recesses 49 therein are in alignment and the projection 48 is then rotatable into said recesses from the position shown in Fig. 2 to permit opening of lock guard 38. However if either of the shift levers 1 or 2 is in a shifted position the recesses 49 are out of alignment and the projection 48 is then locked against movement from the position shown in Fig. 2 to prevent opening of the lock guard.

Means is provided for preventing removal of the gear shifting device from the gear set upon locking thereof such means including a projecting lug 50 on shift lever 1 adapted to co-operate with a projection 51 on adaptor plate 21. Upon locking of the gear shifting device lug 50 is located immediately below projection 51 to prevent upward movement of the device with respect to the adapter plate 21 and since said plate is secured to the gear set casing by screws 22 concealed by the casing of the gear shifting device, it is apparent that it is impossible to remove the device from the gear set. However it will be observed from Fig. 2 that upon unlocking of the gear shifting device and shifting of lever 1 into its left hand shifted position, lug 50 will clear projection 51 to permit removal or mounting of the dveice. If desired the projection 51 can be made integral with the gear set casing.

From the foregoing it is apparent that a very simple, rugged and compact locking means is provided, which is adapted to securely lock the selector mechanism to prevent unauthorized use of the automobile with which the gear shifting device is associated. In connection with the foregoing it should be noted that upon locking of the selector mechanism in neutral it is impossible to move a gear into mesh even though the ends of the shift rods are exposed as shown in Figs. 1 and 2.

As before set forth the shift rods are normally locked in their neutralizing and shifted positions through the medium of a tail piece 19 associated with cam 4 and locking parts 21 located on opposite sides of said tail piece and in order to release said locking parts it is necessary to rotate the cam elements 3 and 4 to a given position in the direction indicated by arrows in Fig. 2. Upon movement of the cam elements to such position the neutralizing surfaces thereof co-operate with rollers 5 and 6 to prevent movement of either of the shift levers 1 or 2 to a degree sufficient to effect meshing of the controlled gears.

What I claim as new and desire to secure by Letters Patent is:

1. The combination with a preselective gear shifting device including a part adapted to be preset in given positions for selection of shifting operations of the controlled gears and neutralization of all of the same, a lock for locking said part in a position for neutralization of the controlled gears, and means associated with said lock to prevent operation thereof except upon neutralization of the controlled gears and said part.

2. The combination with a preselective gear shifting device including a selector part adapted to be preset in any one of a plurality of given positions for selection of shifting operations of the controlled gears and for neutralization thereof, of a key actuated lock for locking said part in a position for neutralization of the controlled gears, and a lock guard having means associated therewith to prevent insertion of the key in the lock except upon neutralization of the controlled gears.

3. The combination with a preselective gear shifting device including gear shifting members and parts to be set in given positions to effect different shifting operations of said members selectively and in another position to effect neutralization thereof, of a key actuated lock for maintaining said parts in a position for neutralization of the controlled gears, and a lock guard interlocked with the gear shifting members and with said selector parts to prevent actuation of said lock except upon neutralization of the controlled gears and setting of said parts in a position for neutralization of said members.

4. The combination with a preselective gear shifting device including oscillatable gear shifting members and means for effecting shifting and neutralizing operations of said members selectively said means including a part to be preset in given positions for selection of shifting operations of said members and in another position for neutralization of said members, of a key actuated lock associated with said part to lock the same in said last mentioned position, and a movable lock guard associated with said lock for covering the key opening therein, said lock guard being interlocked with said gear shifting members and with said selector part to insure against insertion of a key in said lock except upon neutralization of said gear shifting members and setting of said selector part in its neutralizing position.

5. The combination with a preselective gear shifting device to be secured to a gear set casing, said device including oscillatable gear shifting members and means for effecting shifting and neutralizing operations of said members selectively said means including a part to be preset in given positions for selection of the shifting operations of said members and in another position for neutralization of said members, of means for locking said part in a position for neutralization of said members, and means associated with said gear shifting members to be set thereby for preventing removal of the device from the gear set casing upon neutralization of said members.

6. The combination with a preselective gear shifting device including oscillatable gear shifting members and means for effecting shifting and neutralizing operations of said members selectively, said means including a part to be preset in given positions for selection of shifting operations of said members and in another position for neutralization of said members, of a key actuated lock associated with said part to lock the same in said last mentioned position, and a lock guard movable in opposite directions to cover and expose the key opening in said lock, said guard being interlocked with said gear shifting members and with said selector part to insure against exposure of the key opening in said lock except upon neutralization of said gear shifting members and setting of said selector part in its neutralizing position and to also insure against operation of said selector part upon opening of said guard.

7. The combination with a gear shifting mechanism having an actuating element and speed selecting means, said element and said means being separately operable and the latter being adapted to be set for preventing the gears when in neutral relation from being moved out of such relation, of means to lock the former means when so set and including means to insure against locking of said former means except when the gears are in neutral relation.

8. The combination with a gear shifting mechanism having an actuating element and speed selecting means, said element and said means being separately operable and said means having a neutral position wherein it prevents the gears when in neutral relation from being moved out of such relation, of locking means for said selecting means, said locking means including means which insures setting of said selecting means in such neutral position and also neutralization of the gears prior to locking.

In witness whereof, I have hereunto subscribed my name.

HERMAN J. TAYLOR.